Figure 1:
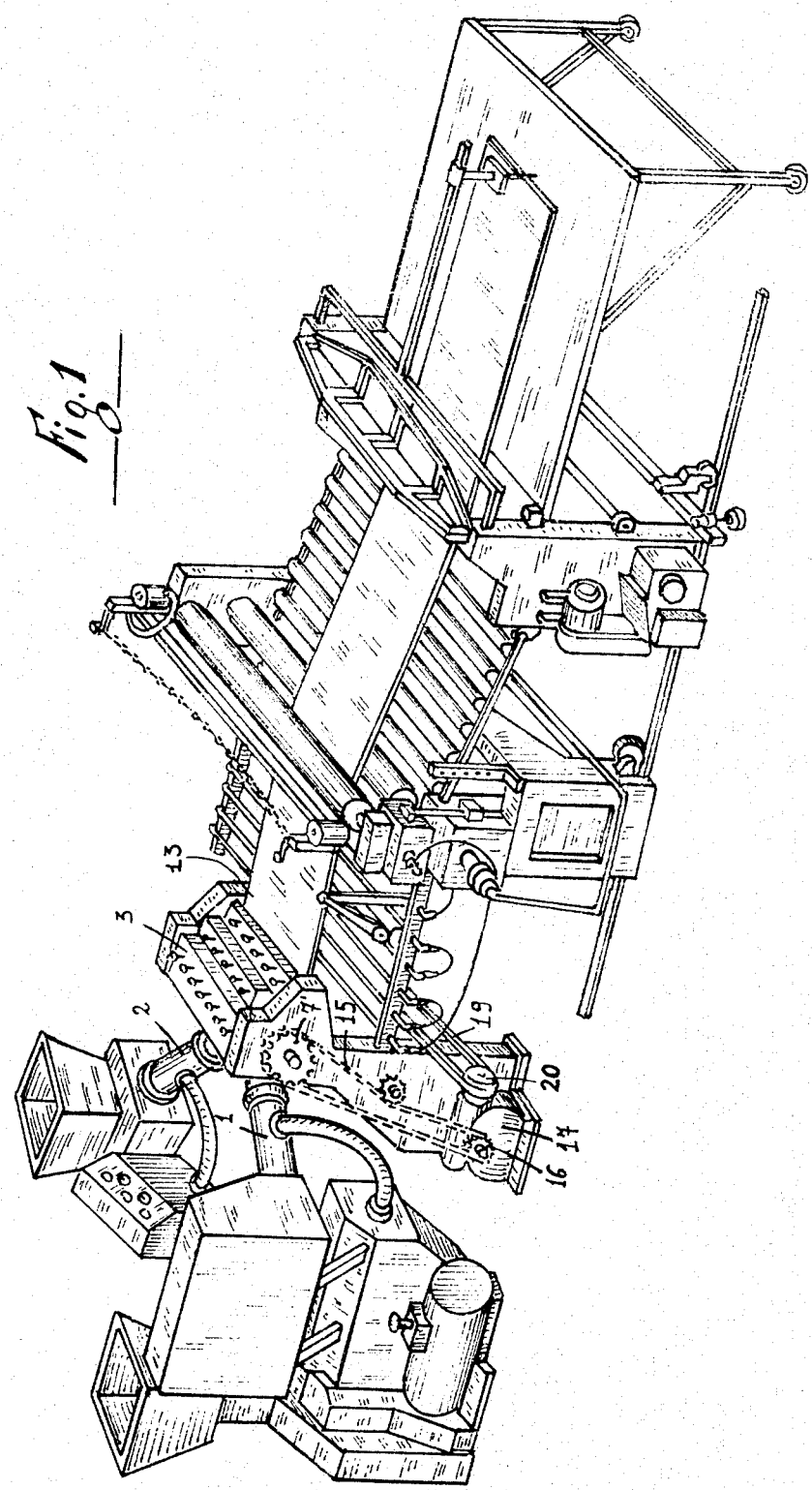

United States Patent [19]
Luraschi

[11] 3,778,207
[45] Dec. 11, 1973

[54] APPARATUS FOR MOLDING THERMOPLASTIC LAMINATE, SHOWING STRIP VARIEGATIONS

[76] Inventor: Marisa Luraschi, c/o Cicogna Franco & Co. 14a Via Visconti di Modrone, Milano, Italy

[22] Filed: May 11, 1971

[21] Appl. No.: 142,225

Related U.S. Application Data

[63] Continuation-in-part of Ser. No. 50,504, June 29, 1970, Pat. No. 3,718,413.

[30] Foreign Application Priority Data
May 13, 1970 Italy .............................. 24565 A/70

[52] U.S. Cl. .................. 425/131, 425/224, 425/363, 425/382, 264/176
[51] Int. Cl. ............................ B29f 1/12, B29f 3/12
[58] Field of Search ..................... 425/131, 132, 224, 425/363, 382, 130; 264/171, 174, 176

[56] References Cited
UNITED STATES PATENTS
2,803,041  8/1957  Hill et al. ......................... 425/132 X
3,531,828  10/1970  Nauta ................................ 425/131

Primary Examiner—Robert L. Spicer, Jr.
Attorney—Fernanda M. Fiordalisi

[57] ABSTRACT

A machine for the manufacture of a thermoplastic laminate, showing multiform interlacing variegations, including two or more extruders, supplying the thermoplastic material to two different ducts one of which is connected to a die-plate, consisting of a main duct connected to a distribution duct adjacent a cavity in which there is accomodated a rotary screw conveyor and provided with grooves at its peripheric surface, said screw conveyor supplying the molten thermoplastic material to the openings of the die-plate disposed perpendicular to the main duct and communicating with the flow of molten thermoplastic material conveyed by the other extruder according to the patent application Ser. No. 50,504, filed June 29, 1970, now U.S. Pat. No. 3,718,413, the improvement residing in the fact that the aforesaid openings of the die-plate are arranged in groups of two or more openings, said groups being spaced from each other.

5 Claims, 9 Drawing Figures

APPARATUS FOR MOLDING THERMOPLASTIC LAMINATE, SHOWING STRIP VARIEGATIONS

RELATED U.S. APPLICATION

This patent application is a continuation-in-part of my previous patent application Ser. No. 50,504 filed on 29 june 1970, now U.S. Pat. No. 3,718,413, and relates to a manufacturing process of a thermoplastic laminate, obtained by extrusion and showing over its width variegations disposed as symmetrical or non-symmetrical strips bands with multiform variegated interlacing as well as the improved machine adapted to embody such manufacturing process.

In the U.S. Pat. application Ser. No. 50504, now U.S. Pat. No. 3,718,413 there was disclosed a manufacturing process and a machine permitting to obtain a thermoplastic laminate, showing some variegations with a multiform variegated interlacing, extending over the entire surface of the laminate itself.

The manufacturing process and the improved machine according to this invention are differentiated from those of the patent application, referred to hereinabove, because they permit to obtain a thermoplastic laminate, in which the variegations occur disposed on "bands" symmetrically disposed or not over the entire width of the bottom laminate and at different height.

The manufacturing process according to the present invention permits to obtain thermoplastic laminates, showing particular aesthetical effects, which are adapted for further workmanships.

In particular, thermoplastic laminates are obtained, which are suitable for machining and among other things adapted for the fabrication of spectacles frames, in which, for example, the upper part imitates the tortoise shell, whereas the lower part is perfectly transparent.

As it is well known, the various manufacturing processes known heretofore for thermoplastic laminates with band variegations of the above-described type were discontinuous processes, including the subsequent tapping of many different blocks, the composition of the laminate with the required effect, the hot-pressing of the thus obtained laminate and the evaporation of the solvents used.

The thermoplastic laminate according to the present invention is instead obtained through a continuous process by extrusion and is integrally constituted, throughout its thickness, by one single type of plastic material and is further free from solvents.

As thermoplastic material for the manufacture of the laminate with band variegations one may use the cellulose acetobutyrate, cellulose acetate, methylmetacrylate, shock-proof polystyrene, the acrylonitrile-butadienestyrene terpolymers, polycarbonates or, generally, any thermoplastic resin whatever.

The manufacturing process of the thermoplastic laminate according to the present invention includes the step of continuously conveying by means of two or more screw extruders distinct flows of differently coloured molten material to a particular die-plate.

Said die-plate is constituted of a main duct, through which the plastic material flow is conveyed by means of an extensor, said duct being, in turn, connected to a cavity in which there is housed a screw conveyor feeding from time to time and by pressure said plastic material flow to a series of suitably grouped openings, communicating with the plastic material flow, building the bottom lamellar surface. In this manner, there is provided a resin flow, constituting the bottom or support of the laminate, and more flows of the same thermoplastic material, but with different colouring from the former being injected to the inside or on the support surface and determined zones of the support itself, and constituting the multiform variegated interlacing bands. The thermoplastic material flows, constituting the aforementioned multiform variegated interlacing bands are not continuous, but intermittent, thereby provoking the injection to the inside or on the surface of the support of "points" or slots of different colouring.

The instant process thus permits to regulate both the distribution of the bands over the width of the bottom laminate or support and the rate of the aforesaid flows as well as the length of the various points or slots and their mutual distance. Said intermittent injection of the thermoplastic material flow, constituting the band variegations, is obtained by using a particular screw conveyor, housed in a particular cavity of the die-plate and provided with grooves on the peripheric surface which by picking up the thermoplastic material conveyed by an extruder injects it into the openings or slots of the die-plate.

Figure 2:
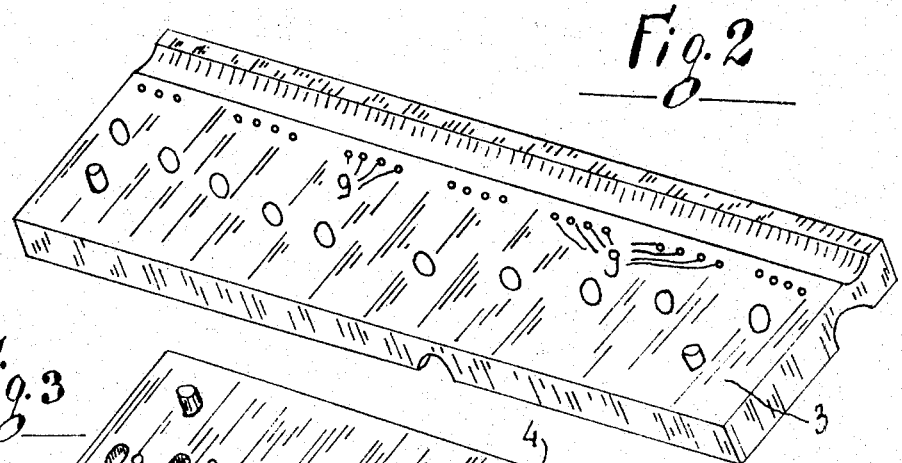
Figure 3:
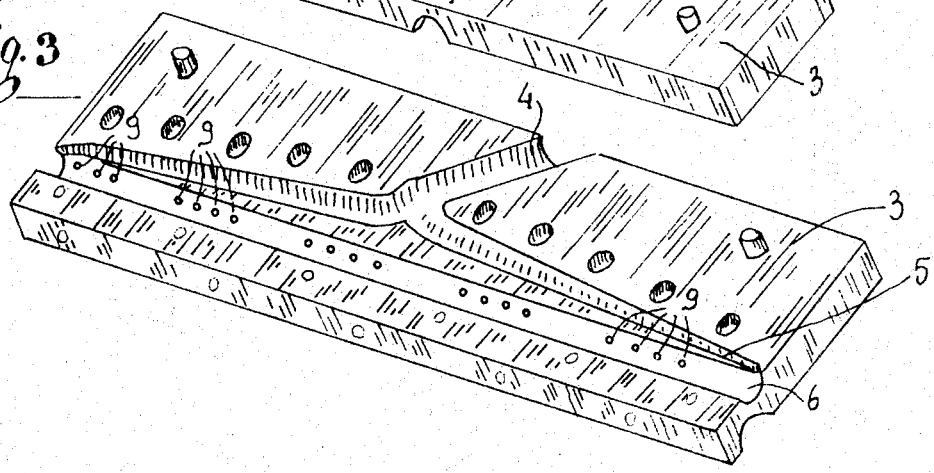
Figure 4:
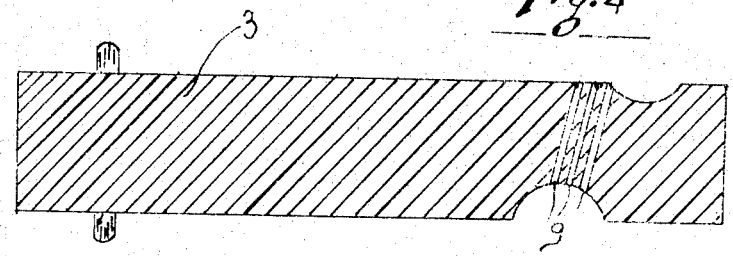
Figure 5:
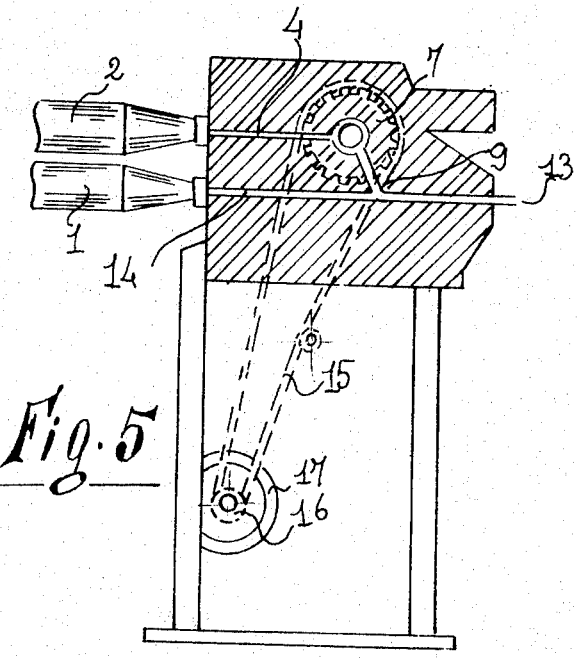
Figure 6:
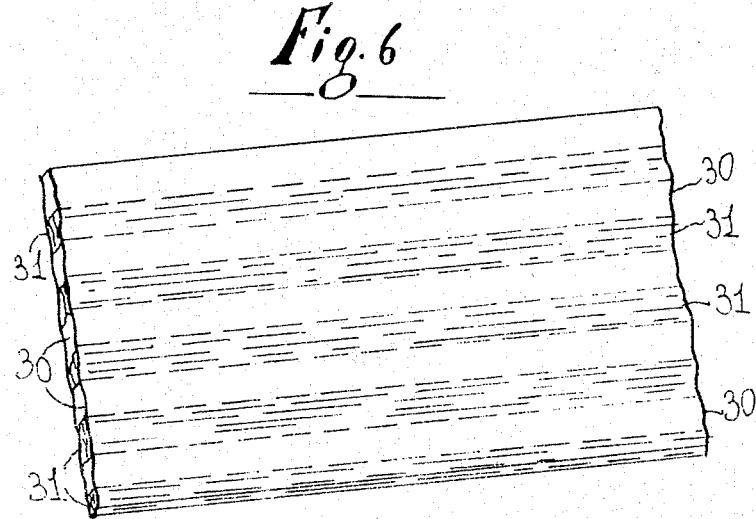
Figure 7:
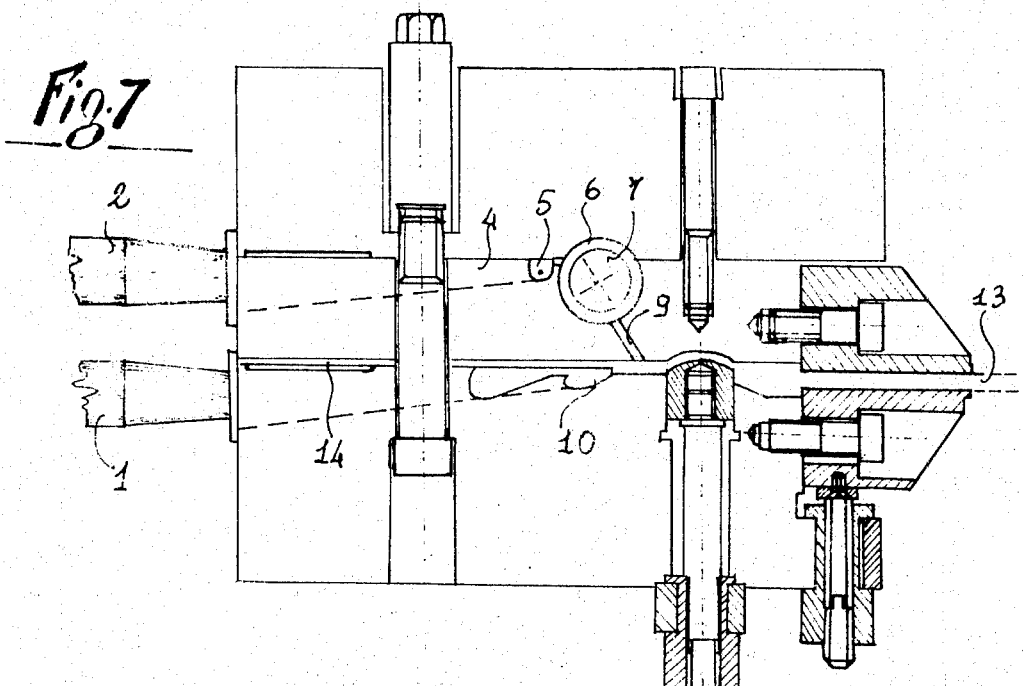
Figure 8:
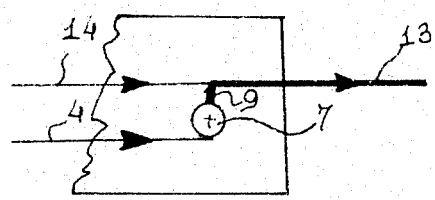
Figure 9:
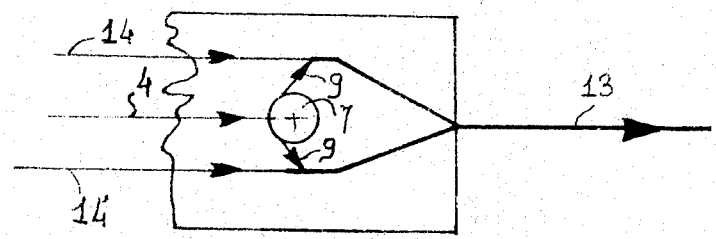

These and other features of the machine and manufacturing process according to the present invention could better be understood from the following detailed description and with the aid of the various figures on the accompanying drawings, in which:

FIG. 1 shows in a perspective side view the machine according to this invention, FIG. 2 and FIG. 3 represent a perspective view of the upper and respectively internal surface of the die-plate as used in the machine shown in FIG. 1, FIG. 4 shows a cross view of the die-plate represented in FIG. 2 with a normal vertical plane relative to the longitudinal axis of the die-plate itself, FIG. 5 shows a cross view of the machine according to this invention at the die-plate head, FIG. 6 represents a perspective view from the top of the variegated band thermoplastic laminate obtained by the instant machine, FIG. 7 shows a side view of the special die-plate as fitted to the instant machine, and cut with a vertical and parallel plane to the extruding direction of the variegated band thermoplastic laminate, FIG. 8 and FIG. 9 show two schematical views illustrating the process according to this invention and respectively in the case in which the laminate is produced by two or three flows of plastic material.

In the former case as exemplified in FIG. 8 there are two flows one of which has the task of building up the bottom or support, whereas the other flow constitutes the multiform variegated interlacing on one or more layers.

In latter case as exemplified in FIG. 9, the production of the laminate takes place by using three flows of thermoplastic resin two of which serve as bottom or support, whereas the third flow constitutes the multiform variegated interlacing on two or more layers.

Referring now particularly to the reference numerals of the figures on the accompanying drawings, the machine according to this invention includes in its essential parts two or more extruders 1, 2 supplying the molten plastic material to a die-plate 3, the former directly and the latter via a screw conveyor 7 regulating the flow of plastic material. The extruder 2, in the specific case illustrated in FIGS. 5 and 7, conveys the plastic materials into the duct 4, connected to a distribution duct 5, being adjacent a cavity 6, wherein there is accommodated a screw conveyor 7.

The latter is provided with a series of grooves 7, being suitably inclined and arranged at the peripheric surface thereof. Said screw conveyor 7 is caused to rotate by a motor (not shown in the figure), transmitting its motion to a belt 19. The latter rotates, in turn, a pulley 20, fitted to a speed reducer 17, provided with a secondary reduction shaft, made integral with a pinion 16.

Said organ transmits its own motion to a chain 15, driving the pinion 7', made integral with the screw conveyor 7.

Said screw conveyor 7 via the grooves 7'' and by its rotation conveys at a high pressure and at regular time intervals flows of plastic material coming from the duct 4 to the openings 9 of the die-plate 3.

The openings 9 of the die-plate 3 run perpendicular to the duct 4 and are arranged in groups of two or more each. Each group is separated from the other and the number of openings of each group and their distance depend on the number of variegations and bands which should be obtained on the plastic laminate and their distance.

Said openings 9 communicate with the flow of the thermoplastic material conveyed by the extruder 1.

The particular groupwise arrangement of two or more of the aforesaid openings 9 permits to obtain laminates, wherein there are alternated in the longitudinal sense of the extruding line only transparent bottom strips 30 and multiform variegated interlacing strips 31 (see FIG. 6).

In the example shown in FIGS. 1, 5, 7 and 8 there are conveyed two flows designated 4 and 14 of the same plastic material, but of different colouring.

The flow 14 constitutes the bottom or support of the laminate, in the desired thickness and required transparent or translucid colour.

The flow 4 which the mechanical rotary device 7 arranges to inject by points inside or on the support surface with an alternating and variable feed frequency as the speed of the screw conveyor varies constituted the multiform variegated interlacing on one or more layers in the required transparent, translucid or opaque colour.

The bottom flow 14 and the variegated effect flow 4 identify themselves at the outlet of the die-plate in one single laminate 13.

In the example as schematically shown in FIG. 9 there are conveyed to the die-plate three flows 4, 14 and 14' of the same plastic material, but of different colouring; the flows 14 and 14' constitute the bottom or support of the laminate, in the required thickness and transparent or translucid colour.

The flow 4 which the mechanical rotary device 7 arranges to simultaneously and intermittently inject inside (or on the surface) of both bottom layers at an alternating and preset feed frequency bilds the band of the multiform variegated interlacing on two or more layers, in the required transparent, translucid or opaque colour.

The bottom flows 14 and 14' and the variegated effect flows 4 identify themselves at the outlet of the die-plate in one single laminate 13.

In this specific case, the laminate is produced by two flows one of which 14 serves as bottom or support, whereas the other one 4 constitutes the multiform variegated interlacing bands.

In such specific case, different effects are attained by separately changing the relative speed of the two flows or by separately varying the speed or the design or the rotation speed or the mechanical rotary device 7.

Some further multiform variegated effects may be obtained by simultaneously varying the three parameters of the aforesaid device.

It is also possible, furthermore, to obtain quite different effects by inserting over the laminate path, inside the die-plate and after the injection of the variegated effect flow, suitable stationary or movable devices, provoking motions or sliding movements of different variegated flow interlacing.

In the case instead of producing the laminate by three flows of thermoplastic resin two of which serve as bottom or support, whereas the third flow constitutes the multiform variegated interlacing, on two or more layers, it is possible to obtain in different manner quite different aesthetical effects. For example, it is possible to reverse the three distinct flows by separately changing their relative speeds or by suitably varying the speed and/or the profile and/or the rotation direction of the mechanical rotary device.

It is further possible to change the three parameters of the aforementioned device, and one may insert over the laminate path, inside the die-plate and after the injection of the variegated effect flow, suitable stationary or movable devices which provoke motions or sliding movements with different interlacing of the aforementioned flows.

It is further possible, according to the process of this invention, to produce the laminate by more than three flows of thermoplastic resin by doubling and combining the above-outlined schemes.

It is understood that the laminate with band or strip variegations thus obtained is subjected to normal treatment processes as provided for in the art.

In all above-described cases, the particularity of the process resides in the fact that the extruded thermoplastic laminate is continuously produced as a unit construction, consisting therefore of one single resin or compatible resins, without the addition of solvents; furthermore, it is immediately ready for use and permits to obtain a multiform band variegated effect, irrespective as to how the bands are arranged, end suitably distributed in the bottom or support laminate and at different height.

What we claim is:

1. An apparatus for the production of a thermoplastic laminate with a multishaped variegated pattern, from at least two flows of molten material, which comprises at least two extruders, each of said extruders being provided with a duct through which the material is conveyed, the material from the first extruder forming the bottom of the laminate, the material from the second extruder forming the multishaped variegated pattern, means for varying the relative speed of the extruders, means for injecting the second material into a plurality of inclined grooves at a predetermined frequency through a rotating device, means for actuating the rotating device, said rotating device being located in a cavity adjacent the duct connected with said second extruder, means for combining said two materials into a single laminate, said grooves being arranged in groups of at least two and spaced at a predetermined distance.

2. The apparatus according to claim 1 wherein said rotating device is a screw which is provided with a series of said inclined grooves at the surface.

3. The apparatus according to claim 1 which comprises at least three extruders, the material from at least one extruder forming the bottom of the laminate, and the material from at least one extruder forming the variegated pattern.

4. The apparatus according to claim 1 which is provided with a speed reducer for adjusting the speed of said rotating device.

5. The apparatus according to claim 1 which is provided with means for changing the direction of rotation of said screw.

* * * * *